US012673257B2

(12) United States Patent
Lin

(10) Patent No.: US 12,673,257 B2
(45) Date of Patent: Jul. 7, 2026

(54) CLAW POWER SUPPLY STRUCTURE

(71) Applicant: FA TENG TECHNOLOGY CO., LTD., Taichung City (TW)

(72) Inventor: Shau-Yu Lin, Taichung City (TW)

(73) Assignee: FA TENG TECHNOLOGY CO., LTD., Taichung City (TW)

(*) Notice: Subject to any disclaimer, the term of this patent is extended or adjusted under 35 U.S.C. 154(b) by 708 days.

(21) Appl. No.: 18/195,924

(22) Filed: May 10, 2023

(65) Prior Publication Data

US 2024/0157229 A1 May 16, 2024

(30) Foreign Application Priority Data

Nov. 11, 2022 (TW) ................................. 111143199

(51) Int. Cl.

*A63F 9/24* (2006.01)
*A63F 9/30* (2006.01)
*G07F 17/32* (2006.01)

(52) U.S. Cl.

CPC .................. *A63F 9/24* (2013.01); *A63F 9/30* (2013.01); *G07F 17/3297* (2013.01); *A63F 2009/2482* (2013.01); *A63F 2009/2492* (2013.01)

(58) Field of Classification Search

CPC ...... A63F 9/24; A63F 9/30; A63F 2009/2482; A63F 2009/2492; G07F 17/3297

See application file for complete search history.

(56) References Cited

U.S. PATENT DOCUMENTS 5,415,417 A * 5/1995 Reis, Jr. .................. G07F 17/32 273/447
5,527,044 A * 6/1996 Lee ..................... G07F 17/3297 273/448
11,615,671 B1 * 3/2023 Shoemaker, Jr. ... G07F 17/3297 273/447
12,429,113 B1 * 9/2025 Lin ........................... F16H 1/16
2024/0157229 A1 * 5/2024 Lin ........................... A63F 9/30
2025/0281823 A1 * 9/2025 Tsai .................... G07F 17/3297

FOREIGN PATENT DOCUMENTS

CN 118436969 A * 8/2024 ............... A63F 9/30
KR 102893587 B1 * 12/2025 ......... G07F 17/3253
WO WO-2023126946 A1 * 7/2023 ......... G07F 17/3297

* cited by examiner

*Primary Examiner* — Raleigh W Chiu
(74) *Attorney, Agent, or Firm* — Che-Yang Chen

(57) ABSTRACT

A claw power supply structure includes a moving seat and a claw. The moving seat includes a base and a reel pivoted to the base. Both sides of a periphery of the reel have a pair of flanges. A pair of electrically conductive rings is provided on the two flanges. The base includes an electrically conductive plate bracket, two electrically conductive plates, and a flexible cable having at least two inner wires wound on the reel. The inner wires of the flexible cable are connected to the electrically conductive rings, respectively. The flexible cable is connected to the claw. The claw includes a drive member. The drive member includes an outer cylinder. The outer cylinder has an accommodation groove therein. An electromagnetic coil is provided in the accommodation groove. The inner wires of the flexible cable are electrically connected to the electromagnetic coil.

4 Claims, 6 Drawing Sheets

CLAW POWER SUPPLY STRUCTURE

BACKGROUND OF THE PRESENT INVENTION

Field of Invention

The present invention relates to a claw power supply structure, and more particularly to a claw equipped with a flexible cable having suspension and power supply functions, which achieves the effects of simplified structure, more durability and easier manipulation.

Description of Related Arts

A conventional claw machine, as shown in FIGS. 1 to 3, comprises a box body 10, two longitudinal guide rails 11 symmetrically arranged in the box body 10, a longitudinal moving seat 12 across the longitudinal guide rails 11, and a horizontal moving seat 13 that is slidably connected to the longitudinal moving seat 12. The horizontal moving seat 13 controls a claw 15 to move up and down via a sling 14 that can be rolled up. The claw 15 has a drive member 16. The drive member 16 includes an electromagnetic coil 17 and a magnetically conductive member 18 therein. One end of an elastic spiral cable 19 having a plurality of inner wires 20 passes through a wire hole 21 of the side of the drive member 16 and is electrically connected to the electromagnetic coil 17 inside the drive member 16, and the other end is electrically connected to a power connection bracket 22 of the horizontal moving seat 13, so as to control the electromagnetic coil 17 to be energized or not. When energized, the magnetically conductive member 18 generates a magnetic force to attract the ferromagnetic moving rod 23 of the claw 15 and drive fingers 24 to be in a catch state. When not energized, the magnetically conductive member 18 does not generate a magnetic force to release the ferromagnetic moving rod 23 of the claw 15 and release the fingers 24 to be in a release state. However, in the above-mentioned structure, when the claw machine is operated to catch an article by the player, the elastic spiral cable displaces synchronously along with the horizontal moving seat 13 and the claw and is elastically extended and retracted along with the claw 15 to move up and down. This may cause the following problems:

1. When the claw 15 moves back and forth and moves up and down, the elastic spiral cable 19 is extended, retracted and shaken on and on. The elastic spiral cable 19 constantly rubs against the periphery of the wire hole 21, which makes the elastic spiral cable 19 easy to wear and tear. After a period of time, because of bending back and forth, the inner wires 20 of the elastic spiral cable 19 may be broken to cause malfunction of the claw 5.
2. When the player manipulates the claw 15 to catch an article, the shaking elastic spiral cable 19 will affect the player's line of sight, hinder judgment in the position to catch the article, and make the claw 15 be in a skewed state with uneven center of gravity. This will reduce the enthusiasm and interest of players.
3. When the elastic spiral cable 19 is displaced along with the horizontal moving seat 13 and the claw 15, the shaking elastic spiral cable 19 may be entangled with the article. The traveling horizontal moving seat 13 makes the article and the elastic spiral cable 19 being pulled each other and may damage the inner wires 20.

Accordingly, the inventor of the present invention has devoted himself based on his many years of practical experiences to solve these problems.

SUMMARY OF THE PRESENT INVENTION

The primary object of the present invention is to solve the aforesaid problems and to provide a claw power supply structure, which has better and more practical effects. The claw is suspended by a flexible cable, and the flexible cable supplies power to the claw. The claw is in a catch state when it is energized, or it is not in a catch state when it is not energized. The flexible cable will not be rubbed or pulled, achieving the effects of simplified structure and more durability.

In order to achieve the foregoing object, a claw power supply structure is provided. The claw power supply structure comprises a moving seat and a claw. The moving seat includes a base and a reel pivoted to the base. Both sides of a periphery of the reel have a pair of flanges. A pair of electrically conductive rings is provided on respective sides of the two flanges, facing away from each other. The base includes an electrically conductive plate bracket with a power supply, two electrically conductive plates that extend from the electrically conductive plate bracket and are in contact with the respective electrically conductive rings, and a flexible cable having at least two inner wires wound on the reel. The flanges each have a perforation. First ends of the inner wires of the flexible cable are inserted through the perforations of the flanges and connected to the electrically conductive rings, respectively. Second ends of the inner wires of the flexible cable are connected to a top of the claw. The claw includes a drive member. The drive member includes an outer cylinder. The outer cylinder has an accommodation groove therein. An electromagnetic coil is provided in the accommodation groove. A top of the outer cylinder is covered with a top cover. The top cover has a central through hole. The flexible cable passes through the central through hole, and the inner wires of the flexible cable are electrically connected to the electromagnetic coil.

In one embodiment of the present invention, the base further includes a power connection bracket and a power connection cable connected between the power connection bracket and the electrically conductive plate bracket.

In one embodiment of the present invention, the perforations of the flanges are located on inner peripheries of the respective electrically conductive rings.

In one embodiment of the present invention, an outer layer of the flexible cable is made of PVC (polyvinyl chloride), PUR (polyurethane) or TPE (thermoplastic elastomer) to cover the inner wires.

With the above-mentioned structure, the flexible cable will not be rubbed or pulled and will not obstruct the player's line of sight, achieving the effects of simplified structure, more durability and easier manipulation.

DETAILED DESCRIPTION OF THE PREFERRED EMBODIMENT

Embodiments of the present invention will now be described, by way of example only, with reference to the accompanying drawings.

Figure 1:
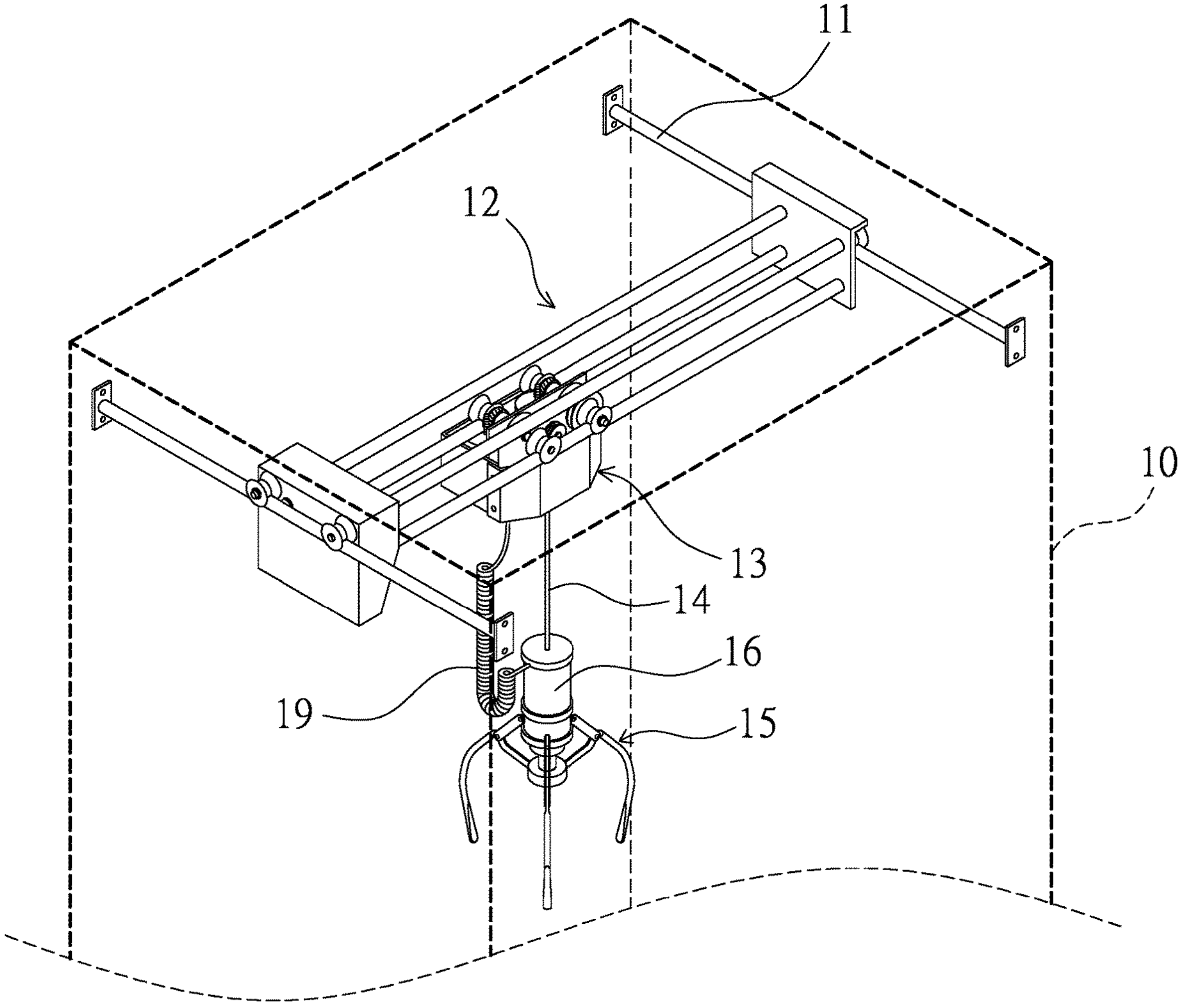
FIG.1 PRIOR ART
FIG. 1 is a partial perspective view of a conventional claw machine.
Figure 2:
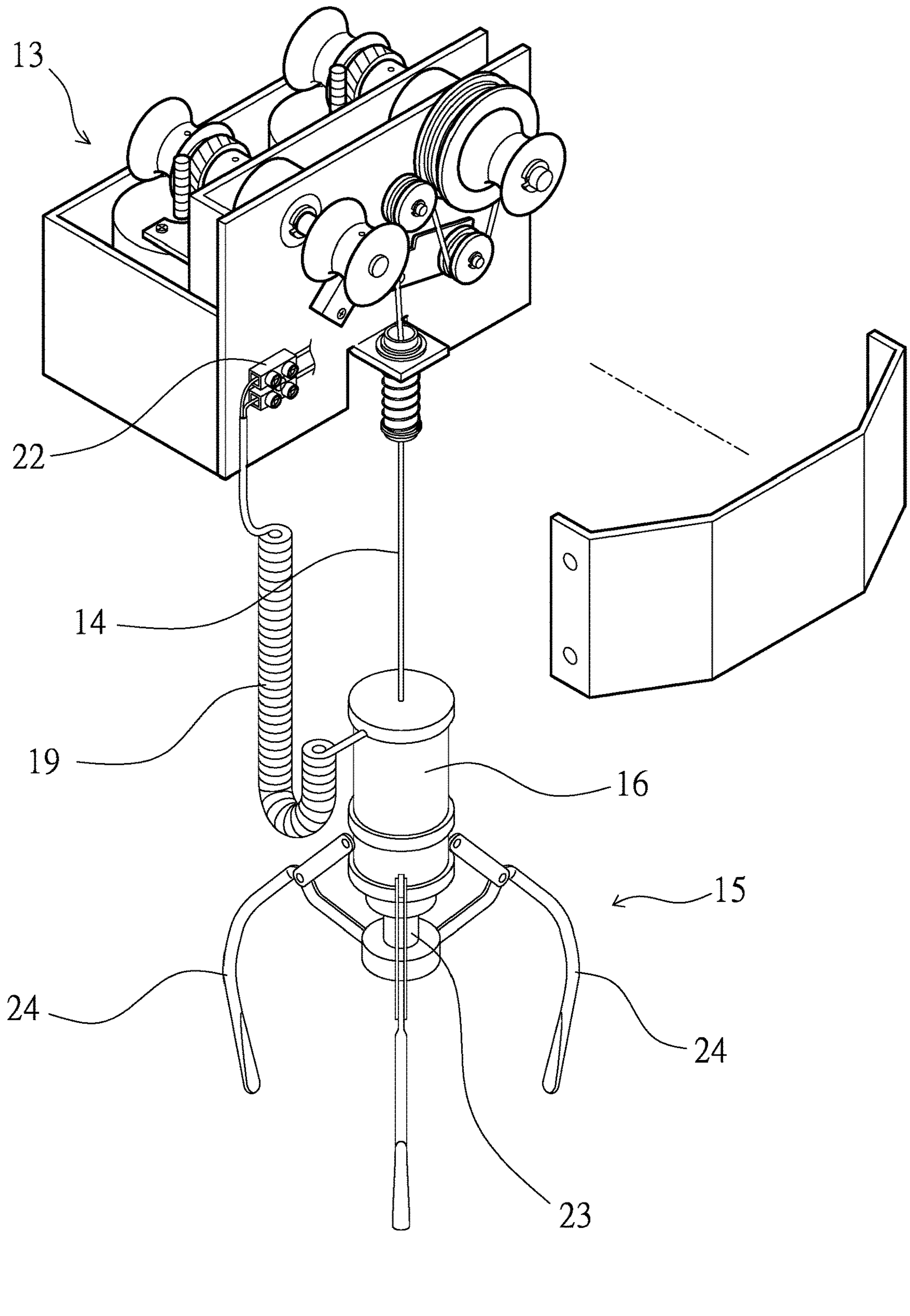
FIG.2 PRIOR ART
FIG. 2 is a perspective view of a claw powered by an elastic spiral cable of the conventional claw machine.
Figure 3:
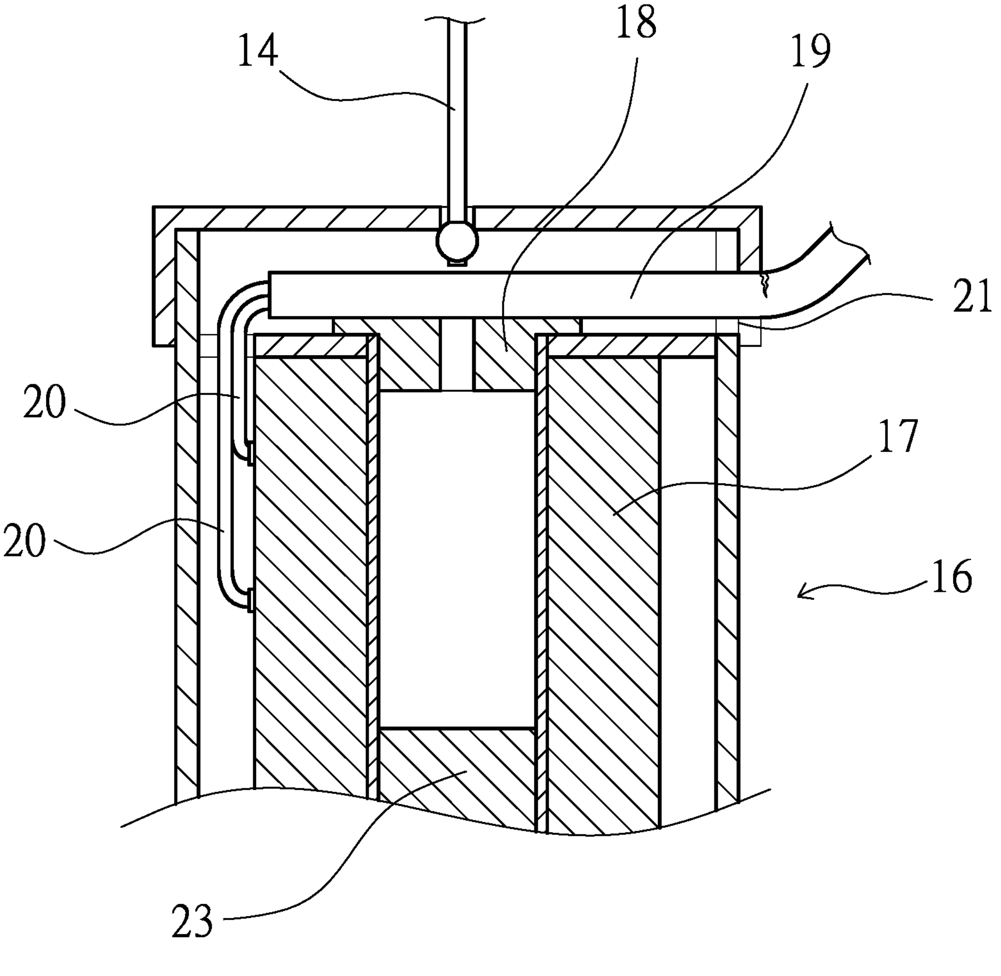
FIG.3 PRIOR ART
FIG. 3 is a cross-sectional view showing connection of the claw and the elastic spiral cable of the conventional claw machine.
Figure 4:
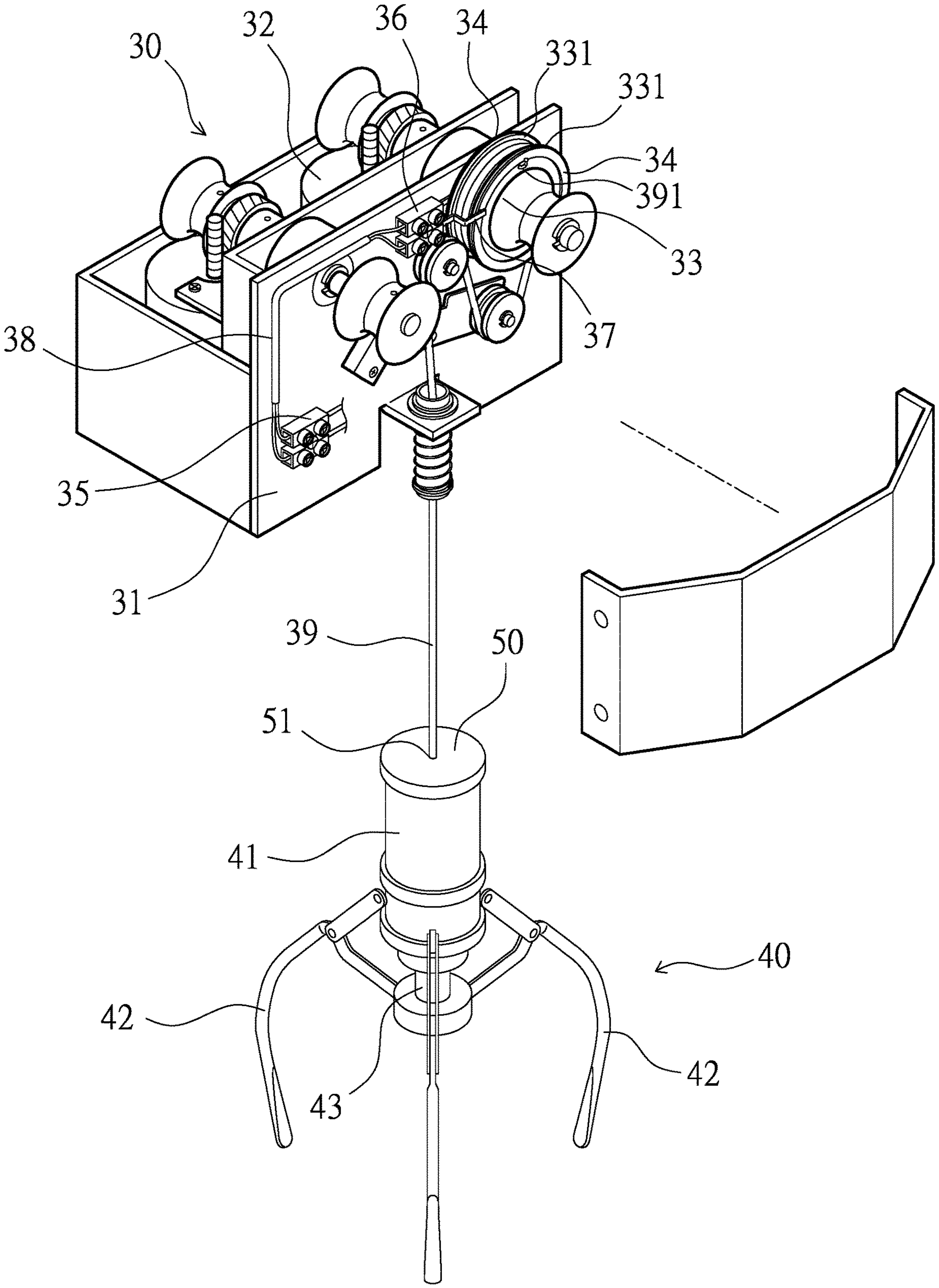
FIG. 4 is a perspective view of the present invention, wherein the flexible cable supplies power to the claw.
Figure 5:
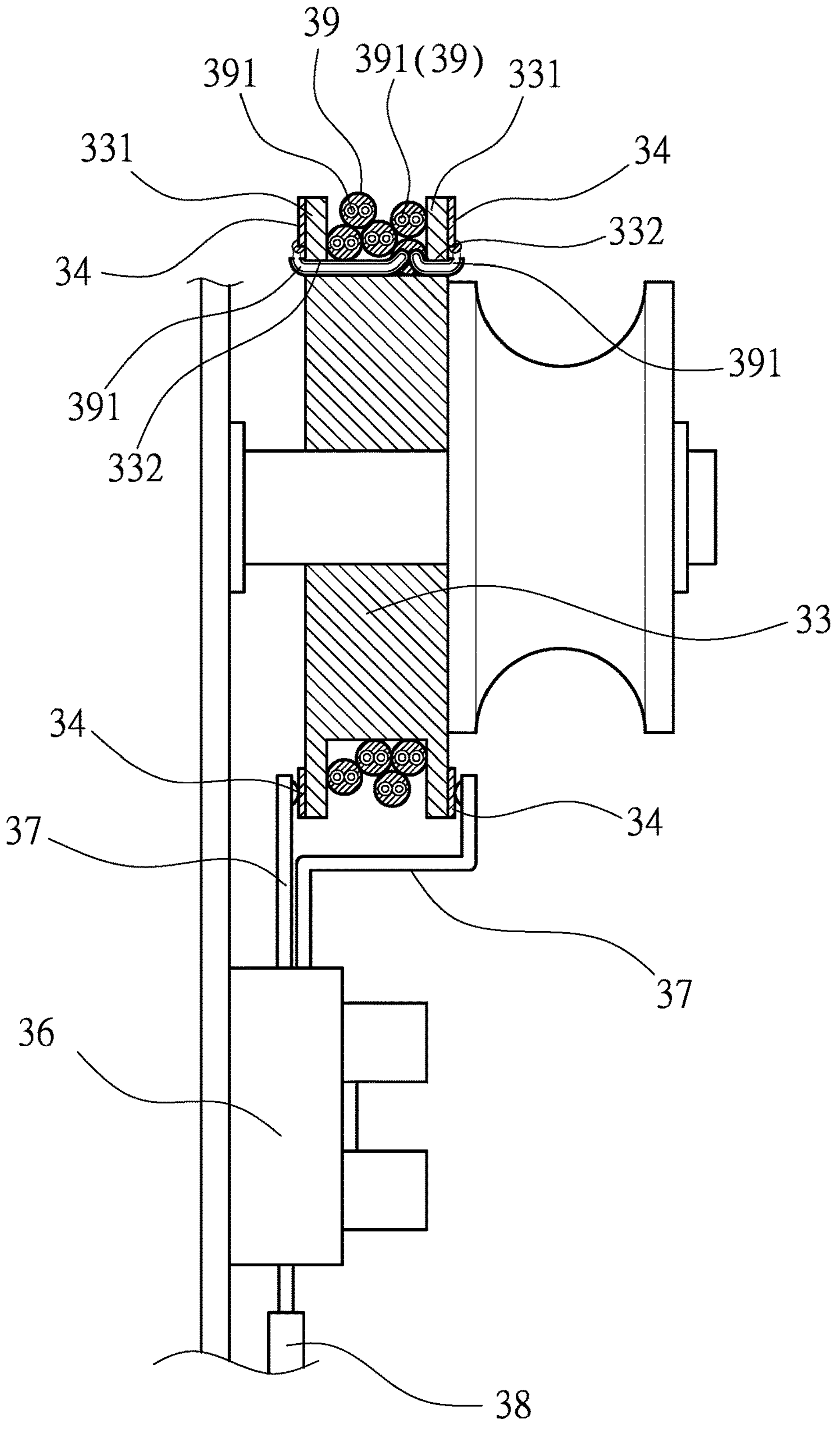
FIG. 5 is a cross-sectional view of the present invention, wherein the electrically conductive plates are in contact with the reel to be energized.
Figure 6:
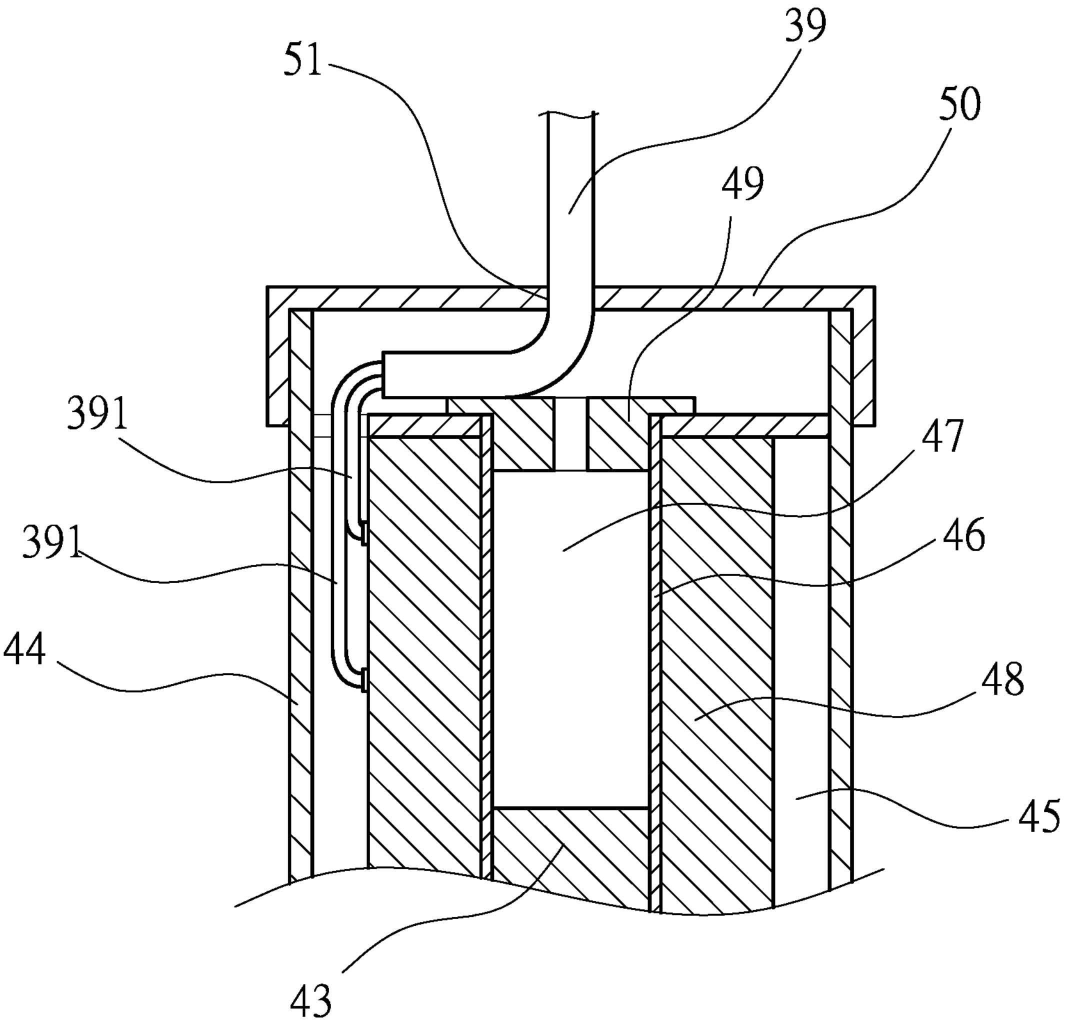
FIG. 6 is a cross-sectional view of the present invention, showing connection of the flexible cable and the claw.

Referring to FIGS. 4 to 6, a claw power supply structure comprises a moving seat and a claw 40.

The moving seat 30 includes a vertical base 31 and a motor 32 on the base 31. The motor 32 is configured to drive a reel 33 pivoted to the base 31 to rotate. Both sides of the periphery of the reel 33 have a pair of flanges 331. A pair of electrically conductive rings 34 is provided on the sides of the two flanges 331, facing away from each other. The base 31 includes a power connection bracket 35, an electrically conductive plate bracket 36, two electrically conductive plates 37 that extend from the electrically conductive plate bracket 36 and are in contact with the respective electrically conductive rings 34, a power connection cable 38 connected between the power connection bracket 35 and the electrically conductive plate bracket 36 for the two electrically conductive plates 37 to be energized to form a power supply, and a flexible cable 39 having at least two inner wires 391 wound on the reel 33. The flanges 331 each have a perforation 332 on the inner edges of the two electrically conductive rings 34. The first ends of the inner wires 391 of the flexible cable 39 are inserted through the perforations 332 and connected to the electrically conductive rings 34, respectively. The second ends of the inner wires 391 of the flexible cable 39 are connected to the top of the claw 40.

The claw 40 includes a drive member 41, a ferromagnetic moving rod 43, and a plurality of fingers 42 driven by the ferromagnetic moving rod 43. The drive member 41 includes an outer cylinder 44. The outer cylinder 44 has an accommodation groove 45 therein. A pipe 46 having an axial hole 47 is provided inside the accommodation groove 45. An electromagnetic coil 48 is sleeved on the outer periphery of the pipe 46. A magnetically conductive member 49 is provided on the top of the axial hole 47 of the pipe 46. The top of the outer cylinder 44 is covered with a top cover 50. The top cover 50 has a central through hole 51. The flexible cable 39 passes through the central through hole 51, and the inner wires 391 are electrically connected to the electromagnetic coil 48. The ferromagnetic moving rod 43 movably passes through the bottom of the accommodation groove 45 and the bottom of the pipe 46 and is inserted in the axial hole 47. When the flexible cable 39 and the electromagnetic coil 48 are energized, the magnetically conductive member 49 generates a magnetic force to attract the ferromagnetic moving rod 43 for the fingers 42 to be in a catch state. When the flexible cable 39 and the electromagnetic coil 48 are not energized, the magnetically conductive member 49 does not generate a magnetic force and releases the ferromagnetic moving rod 43 for the fingers 42 to be in a release state. With the above-mentioned structure, the flexible cable 39 supplying power to the claw 40 will not be rubbed or pulled and will not obstruct the player's line of sight, achieving the effects of simplified structure, more durability and easier manipulation.

The assembly, function and effect of the above-mentioned embodiment are described in detail below. Please refer to FIGS. 4 to 6. The outer layer of the flexible cable 39 of the present invention is made of PVC (polyvinyl chloride), PUR (polyurethane), TPE (thermoplastic elastomer), etc. to cover the inner wires 391. In addition to increasing the flexibility of the cable, it has excellent flexural resistance, but not limited thereto. The ferromagnetic moving rod 43 may be made of materials such as iron, cobalt, nickel, etc., so that it can be attracted by the energized magnetically conductive member 49 (forming an electromagnet), but not limited thereto. The present invention integrates the power supply cable and the sling of the claw 40 to be an integral structure. After integration, the overall structure of the claw 40 is more simplified, and the power supply cable is safer and more durable. Besides, it can overcome the problem that the power supply cable may obstruct the player's line of sight. In this way, the enthusiasm and interest of players to play the game can be further improved. The power connection bracket 35 serves as the source for controlling the claw 40 to be energized or not. After the base 31 is integrated and designed, the electrically conductive plate bracket 36 may be directly used as the source for controlling the claw 40 to be to be energized or not. In other words, the electrically conductive plate bracket 36 is directly connected to the power supply. The two electrically conductive plates 37 are respectively connected to the positive pole and the negative pole of the power supply for the electrically conductive plates 37 to be energized or not. This will simplify the structure of the base 31. The electrically conductive rings 34 and the electrically conductive plates 37 may be made of copper with good conductivity, but not limited thereto. The inner wires 391 pass through the perforations 332 of the flanges 331 and are connected to the inner peripheries of the electrically conductive rings 34 by welding. Because the electrically conductive plates 37 extend from the outside of the reel 33 to be in contact with the electrically conductive rings 34, the contact points (solder points) located on the inner wires 391 and the inner peripheries of the electrically conductive rings 34 will not affect, hinder the contact between the rotating electrically conductive rings 34 and the electrically conductive plates 37. Furthermore, the electrically conductive plates 37 made of metal have elasticity. The electrically conductive plates 37 elastically abut against the electrically conductive rings 34 that are rotated along with the reel 33 to ensure stable power supply to the claw 40. To sum up, the flexible cable 39 directly supplies power to the claw 40, without an additional power cord that is easy to shake, so as to avoid failure and damage caused by winding and pulling. The player's line of sight won't be obstructed. The structure is simple and durable.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A claw power supply structure, comprising a moving seat and a claw;

the moving seat including a base and a reel pivoted to the base, both sides of a periphery of the reel having a pair of flanges, a pair of electrically conductive rings being provided on respective sides of the two flanges, facing away from each other; the base including an electrically conductive plate bracket with a power supply, two electrically conductive plates that extend from the electrically conductive plate bracket and are in contact with the respective electrically conductive rings, and a flexible cable having at least two inner wires wound on the reel; the flanges each having a perforation, first ends of the inner wires of the flexible cable being inserted through the perforations of the flanges and connected to the electrically conductive rings, respectively; second ends of the inner wires of the flexible cable being connected to a top of the claw;

the claw including a drive member, the drive member including an outer cylinder, the outer cylinder having an accommodation groove therein, an electromagnetic coil being provided in the accommodation groove, a top of the outer cylinder being covered with a top cover, the top cover having a central through hole, the flexible cable passing through the central through hole, the inner wires of the flexible cable being electrically connected to the electromagnetic coil.

2. The claw power supply structure as claimed in claim 1, wherein the base further includes a power connection bracket and a power connection cable connected between the power connection bracket and the electrically conductive plate bracket.

3. The claw power supply structure as claimed in claim 1, wherein the perforations of the flanges are located on inner peripheries of the respective electrically conductive rings.

4. The claw power supply structure as claimed in claim 1, wherein an outer layer of the flexible cable is made of PVC (polyvinyl chloride), PUR (polyurethane) or TPE (thermoplastic elastomer) to cover the inner wires.

* * * * *